United States Patent
Marking

(10) Patent No.: US 6,245,260 B1
(45) Date of Patent: Jun. 12, 2001

(54) MIXED FLUX FOR YTTRIUM TANTALATE X-RAY PHOSPHORS

(75) Inventor: Gregory A. Marking, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/384,598

(22) Filed: Aug. 27, 1999

(51) Int. Cl.[7] ............... C09K 11/78; C09K 3/00
(52) U.S. Cl. ............... 252/301.4 R; 106/313; 148/26; 423/893; 423/863
(58) Field of Search ............... 252/301.4 R; 423/593, 423/263; 148/26; 106/313

(56) References Cited

U.S. PATENT DOCUMENTS

| | | | |
|---|---|---|---|
| 4,225,653 | 9/1980 | Brixner | 428/539 |
| 4,543,412 * | 9/1985 | Murakawa et al. | 252/62.51 R |
| 4,929,384 | 5/1990 | Reddy | 252/301.4 R |
| 4,929,385 | 5/1990 | Reddy | 252/301.4 R |
| 4,929,386 | 5/1990 | Reddy | 252/301.4 R |
| 5,009,807 | 4/1991 | Reddy | 252/301.4 H |
| 5,112,524 | 5/1992 | Reddy et al. | 252/301.4 R |
| 5,310,505 | 5/1994 | Hedden et al. | 252/301.4 R |
| 5,716,546 | 2/1998 | Cox et al. | 252/301.4 R |
| 5,900,188 * | 5/1999 | Marking et al. | 252/301.4 R |

OTHER PUBLICATIONS

Derwent Abstract for JP 72–001950 B, Apr. 25, 1969.*
Derwent Abstract for JP 73–022814 B, Nov. 12, 1965.*

* cited by examiner

*Primary Examiner*—C. Melissa Koslow
(74) *Attorney, Agent, or Firm*—Robert F. Clark

(57) ABSTRACT

A $Li_2SO_4 \cdot Na_2SO_4$ mixed flux for use in the synthesis of yttrium tantalate x-ray phosphors has been invented. The phosphors made with the mixed flux exhibit a dramatic increase XOF brightness, decreased persistence, and a reduced particle size.

8 Claims, No Drawings

MIXED FLUX FOR YTTRIUM TANTALATE X-RAY PHOSPHORS

TECHNICAL FIELD

This invention relates to yttrium tantalate x-ray phosphors used as intensifier screens for x-ray imaging. More particularly, it relates to flux compositions for yttrium tantalate phosphor synthesis methods.

BACKGROUND ART

Unactivated and niobium activated monoclinic M' yttrium tantalate ($YTaO_4$) X-ray phosphors are used in x-ray intensifying screens for medical radiographic applications. Examples of these phosphors are given in U.S. Pat. Nos. 5,009,807, 5,112,524, and 4,225,653, which are incorporated herein by reference.

One property associated with x-ray phosphors which can cause serious problems is the presence of delayed fluorescence. This delayed fluorescence, also known as afterglow, lag, or persistence, is the emission of light from the phosphor after x-ray excitation is stopped. The presence of a large afterglow in a phosphor screen will compromise the quality of the radiographic images collected using that screen. Particularly, x-ray intensifier screens used in auto-changers in hospitals for routine x-ray procedures require low or zero-lag phosphor screens because the x-ray intensifier screens in automated changers are used many times over a short period of time. In such applications, a high lag phosphor screen can retain a part of the previous image which interferes with the new x-ray exposure. Yttrium tantalate phosphors commonly exhibit substantial levels of phosphor lag. Because these phosphors are used to prepare intensifier screens for use in automated rapid exposure X-ray devices, the availability of such phosphors with the lowest possible lag has become increasingly important in order to obtain high radiographic image quality.

Other properties associated with x-ray phosphors are their XOF (X-ray Optical Fluorescence) brightness and particle size. The use of a brighter x-ray phosphor in intensifier screens shortens exposure time and decreases x-ray dosage for patients needing medical X-ray imaging procedures. However, XOF brightness is usually accompanied by an increase the particle size of the phosphor grains. Increased particle size in intensifier screens reduces the resolution of the resulting x-ray images. Thus, preparation of an x-ray phosphor with improved XOF brightness without the concomitant increase in particle size is highly desirable.

Strontium is known to increase XOF brightness and decrease afterglow (persistence and lag) in yttrium tantalates when added to the formulation or to the commonly used $Li_2SO_4$ or $Li_2SO_4$—LiCl fluxes as $SrCO_3$, $SrCl_2$, $SrCl_2 \cdot 6H_2O$, or other $Sr^{2+}$ containing species. The use of eutectic $Li_2SO_4$—LiCl flux increases phosphor brightness but also tends to increase particle size and cause damage to crucibles and ovens. Although Sr increases XOF brightness and decreases persistence, the addition of Sr does not lead generally to the production of a zero lag phosphor and the increase in XOF brightness from Sr addition is not continuous. In particular, high levels of Sr form increased amounts of impurity phases which reduce XOF brightness and increase persistence. Thus, it would be beneficial to have a method to reduce persistence and increase XOF brightness without increasing particle size.

SUMMARY OF THE INVENTION

It is an object of the invention to obviate the disadvantages of the prior art.

It is another object of the invention to provide a method to reduce persistence and increase XOF brightness of yttrium tantalate x-ray phosphors without increasing particle size.

In accordance with one aspect the invention, there is provided a mixed flux for use in yttrium tantalate phosphor synthesis. The mixed flux comprises a mixture of lithium sulfate and sodium sulfate.

In accordance with another aspect of the invention, there is provided a method of making a yttrium tantalate phosphor. The method comprises forming an oxide mixture of yttrium oxide, tantalum oxide, and optionally strontium carbonate, adding a lithium sulfate-sodium sulfate mixed flux to the oxide mixture and firing the mixture at a temperature and for a time sufficient to form the phosphor.

DESCRIPTION OF THE PREFERRED EMBODIMENTS

For a better understanding of the present invention, together with other and further objects, advantages and capabilities thereof, reference is made to the following disclosure and appended claims.

I have discovered that the use of a lithium sulfate-sodium sulfate ($Li_2SO_4$—$Na_2SO_4$) mixed flux during the synthesis of $YTaO_4$ phosphors leads to phosphors with increased XOF brightness and decreased afterglow relative to the same phosphor compositions prepared using the common $Li_2SO_4$ flux. Use of the $Li_2SO_4$—$Na_2SO_4$ mixed flux yields a $YTaO_4$ phosphor with a smaller particle size than can be prepared using pure $Li_2SO_4$ flux in the same total amount.

Using a $Li_2SO_4$—$Na_2SO_4$ mixed flux during synthesis reduces the persistence and lag, increases the XOF brightness, and decreases the particle size in yttrium tantalate X-ray phosphor both with and without the presence of $Sr^{2+}$ species. Powder lags of zero have been obtained with the $Li_2SO_4$—$Na_2SO_4$ mixed flux. The $Li_2SO_4/Na_2SO_4$ weight ratio in the flux ranges from about 0.5 to about 3.0. The total amount of $Li_2SO_4$—$Na_2SO_4$ mixed flux added to the oxide mixture ranges from about 15 to about 50 weight percent (wt. %) of the total oxide mixture. Preferably, the amount of $Li_2SO_4$—$Na_2SO_4$ mixed flux ranges from about 24 to about 32 wt. % of the oxide mixture and the $Li_2SO_4/Na_2SO_4$ weight ratio ranges from about 1.0 to about 1.8 with the most preferred ratio being about 1.8.

The following non-limiting examples are presented.

EXAMPLES

Yttrium tantalate phosphors having the general formula $Y_{1-x}Sr_xTaO_4$, where $0<x<0.04$, were prepared as follows. Referring to Table 1, the oxide mixture was formed by weighing amounts of tantalum oxide, yttrium oxide, and strontium carbonate into 16 ounce glass bottles and intimately mixing by shaking the material on a paint shaker for 30 minutes. All samples, except 1A and 2A, were then blended on a roll mill for 60 minutes. Pulverized flux materials, $Li_2SO_4$ and $Na_2SO_4$ (both screened to −140 mesh), were then weighed and added in the specified amounts. Control samples were made using only a $Li_2SO_4$ flux. The samples were reblended again on the paint shaker for 30 minutes. Again, all samples, except 1A and 2A, were blended on a roll mill for an additional 60 minutes. About 400 grams of 2 mm yttria stabilized zirconia beads were added to all samples and they were blended on a roll mixer for 90 minutes. The beads were separated from the powders and the powders were loaded into 100 ml or 250 ml prefired alumina crucibles. The crucibles were placed into an electric furnace at 800° C. The temperature of the furnace was slowly increased to 1290° C. over 6 hours and held at 1290° C. for 10.5 hours. The furnace was allowed to cool to 800° C. as fast as possible with the door closed and the samples were removed at 800° C. and allowed to cool to room temperature. The cooled fired cakes were placed in 4 liter plastic beakers and soaked with deionized water. The phosphor samples were washed many times with deionized water until free of flux material. The phosphor was filtered, dried overnight at 120° C., sieved to −325 mesh, and coated with 0.02 wt % of M-5 Cab-O-Sil (colloidal silica available from Cabot Corp.).

TABLE 1

| Sample No. | $Y_2O_3$ | $Ta_2O_5$ | $SrCO_3$ | $Li_2SO_4$ | $Na_2SO_4$ | wt. % $Li_2SO_4$ | wt. $Na_2SO_4$ |
|---|---|---|---|---|---|---|---|
| 1A | 45.53 g | 90.00 g | 1.203 g | 43.4 g | — | 32% | — |
| 2A | 45.53 g | 90.00 g | 1.203 g | 24.4 g | 14.0 g | 18% | 10% |
| 1B | 61.32 g | 120.00 g | 3.21 g | 90.7 g | — | 50% | — |
| 2B | 61.32 g | 120.00 g | 3.21 g | 32.6 g | 18.1 g | 18% | 10% |
| 1C | 61.01 g | 120.00 g | 3.21 g | 90.5 g | — | 50% | — |
| 2C | 61.01 g | 120.00 g | 3.21 g | 32.6 g | 18.1 g | 18% | 10% |
| 1D | 61.32 g | 120.00 g | 3.21 g | 90.1 g | — | 50% | — |
| 2D | 60.09 g | 120.00 g | 1.60 g | 50.4 g | — | 28% | — |
| 3D | 61.01 g | 120.00 g | 3.21 g | 32.6 g | 18.1 g | 18% | 10% |

The phosphor samples were measured for XOF brightness and persistence. The brightness and persistence were measured against typical $YTaO_4$ standard samples. X-ray diffraction confirmed that these samples are essentially pure M' $YTaO_4$. Particle sizes were determined by Coulter Counter.

TABLE 2

| Sample No. | $Li_2SO_4$ (wt. %) | $Na_2SO_4$ (wt. %) | XOF Brightness | XOF Persistence | Ave. Dia. ($\mu$m) |
|---|---|---|---|---|---|
| 1A | 32% | — | 1.00 | $4.30 \times 10^{-4}$ | 6.95 |
| 2A | 18% | 10% | 1.21 | $0.27 \times 10^{-4}$ | 6.42 |
| 1B | 50% | — | 1.00 | $2.70 \times 10^{-4}$ | 6.50 |
| 2B | 18% | 10% | 1.23 | $0.12 \times 10^{-4}$ | 6.65 |
| 1C | 50% | — | 1.00 | $2.30 \times 10^{-4}$ | 5.83 |
| 2C | 18% | 10% | 1.28 | $0.21 \times 10^{-4}$ | 6.10 |
| 1D | 50% | — | 1.00 | $0.89 \times 10^{-4}$ | 6.01 |
| 2D | 28% | — | 0.94 | $0.58 \times 10^{-4}$ | 7.12 |
| 3D | 18% | 10% | 1.12 | $0.10 \times 10^{-4}$ | 6.13 |

The data listed in Table 2 demonstrate that using a $Li_2SO_4$—$Na_2SO_4$ mixed flux instead of the common $Li_2SO_4$ flux dramatically increases XOF brightness, reduces XOF persistence, and reduces particle size when the total amount of flux is kept constant. In all cases, the inventive samples are brighter and have lower persistence than the control samples. The particle size in sample 2A is substantially reduced relative to that in sample 1A even though the total amount of flux is lower. This observation is particularly important since it is generally known that decreasing the amount of flux within the range described herein increases particle size. Control samples 1D and 2D demonstrate this increase in particle size when the total amount of flux is decreased. The particle sizes in the inventive samples 2B and 2C are only slightly increased relative to the corresponding control samples 1B and 1C, even though the total amounts of flux were dramatically reduced. The particle sizes of 2D and 3D demonstrate the particle size reduction obtained using the $Li_2SO_4$—$Na_2SO_4$ mixed flux, in comparison to using pure $Li_2SO_4$ flux, when the total flux amount is kept constant.

While there has been shown and described what are at the present considered the preferred embodiments of the invention, it will be obvious to those skilled in the art that various changes and modifications may be made therein without departing from the scope of the invention as defined by the appended claims.

I claim:

1. A mixed flux for use in yttrium tantalate phosphor synthesis comprising: a mixture of lithium sulfate and sodium sulfate wherein the weight ratio of lithium sulfate to sodium sulfate is from about 1.0 to about 1.8.

2. The mixed flux of claim 1 wherein the weight ratio of lithium sulfate to sodium sulfate is about 1.8.

3. A method of making a yttrium tantalate phosphor, the method comprising forming an oxide mixture of yttrium oxide, tantalum oxide, and optionally strontium carbonate; adding a lithium sulfate-sodium sulfate mixed flux to the oxide mixture; and firing the mixture at a temperature and for a time sufficient to form the phosphor wherein the weight ratio of lithium sulfate to sodium sulfate is from about 1.0 to about 1.8.

4. The method of claim 3 wherein the weight ratio of lithium sulfate to sodium sulfate is about 1.8.

5. The method of claim 3 wherein the yttrium tantalate phosphor has a general formula $Y_{1-x}Sr_xTaO_4$, where $0<x<0.04$.

6. The method of claim 5 wherein the weight ratio of lithium sulfate to sodium sulfate is about 1.8.

7. The method of claim 3 wherein the flux is added to the oxide mixture in an amount equal to about 15 to about 50 weight percent of the oxide mixture.

8. The method of claim 7 wherein the weight ratio of lithium sulfate to sodium sulfate is about 1.8.

* * * * *